Patented June 3, 1924.

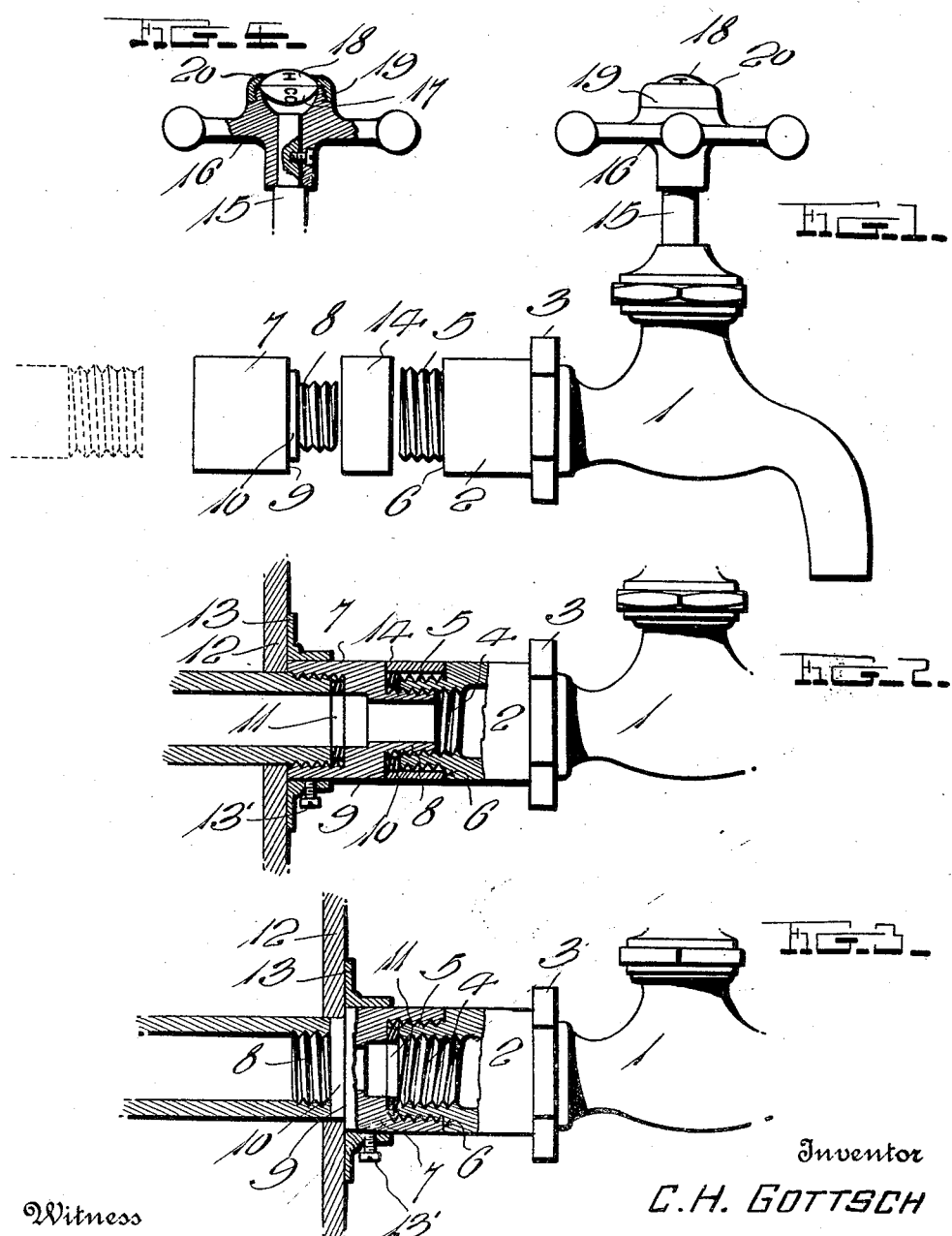

1,496,708

UNITED STATES PATENT OFFICE.

CHRISTIAN H. GOTTSCH, OF NEW HYDE PARK, LONG ISLAND, NEW YORK.

FAUCET AND PIPE ENGAGING COUPLING.

Application filed April 17, 1922. Serial No. 553,773.

*To all whom it may concern:*

Be it known that I, CHRISTIAN H GOTTSCH, a citizen of the United States, residing at New Hyde Park, Long Island, in the county of Nassau and State of New York, have invented certain new and useful Improvements in Faucet and Pipe Engaging Couplings; and I do declare the following to be a full, clear, and exact description of the invention, such as will enable others skilled in the art to which it appertains to make and use the same.

This invention relates to an improved water faucet and coupling for connecting the faucet with a supply pipe and one object of the invention is to provide a faucet and coupling so constructed that the pipe may be connected with supply pipes of different diameters and further so constructed that the faucet may be connected with pipes of different diameters having either internal or external threads, the faucet in some cases being directly connected with the supply pipe and the faucet in other cases being connected with the supply pipe by means of the improved coupling.

Another object of the invention is to so construct the faucet and coupling that when the coupling is screwed into the neck of the faucet instead of being screwed upon this neck, external threads of the neck may be covered by means of a collar which is removable from the threaded neck but firmly held in place when in use.

Another object of the invention is to so construct the coupling and faucet that when the coupling is in use, tight joints may be provided between the coupling and faucet and coupling and supply pipe and thus prevent leakage about the coupling.

Another object of the invention is to provide the faucet with an improved actuating head for the valve stem of the faucet, this head being provided with an improved type of marker for indicating hot or cold water and this marker being so held in place that it may be reversed to permit either "Hot" or "Cold" to show.

This invention is illustrated in the accompanying drawings, wherein:

Figure 1 is a view showing the improved faucet and coupling element in side elevation.

Figure 2 is a view showing the coupler and faucet assembled, the view being principally in longitudinal section and partially in side elevation.

Figure 3 is a view similar to Fig. 2 showing a different assemblage of coupler and faucet.

Figure 4 is a view showing the actuating head for the valve stem in section and showing the manner of mounting the marker so that it may be reversed to disclose either "Hot" or "Cold".

The faucet 1 is provided with an enlarged inlet neck 2 having the usual wrench-engaging portion 3 so that the faucet may be screwed tightly into place. This enlarged neck 2 is internally threaded as shown at 4 and has its free end portion reduced externally to provide a reduced end portion 5 which is externally threaded and a shoulder 6 at the inner end of the reduced and externally threaded end portion 5. It will thus be seen that when it is desired to connect the faucet with a supply pipe which is externally threaded at its end and of the proper size for fitting into the internally threaded neck the faucet may be screwed upon the end of the supply pipe whereas if the supply pipe is internally threaded instead of being externally threaded and of the proper size to receive the externally threaded end portion 5 of the neck 2, the faucet may be screwed into the pipe. Therefore, this faucet may be directly connected with a supply pipe which is relatively large and internally threaded or with a supply pipe which is relatively small and externally threaded. The coupling 7 has one end portion reduced and externally threaded to provide a neck portion 8 and shoulder 9 at the inner end of the externally threaded neck 8 and at its other end has its water passage enlarged thus providing a cup-shaped portion which is internally threaded. The internally threaded end portion of this coupling is of the proper size to permit of the coupling being screwed upon the reduced and threaded end portion 5 of the neck 2 and the reduced and threaded neck portion 8 of this coupling is of the proper size to permit of its being screwed into the faucet neck. Therefore, the coupling may be connected with the faucet neck as shown in Fig. 2 or may be connected with this faucet neck as shown in Fig. 3. When the faucet is to be connected with a supply pipe which is internally threaded and too small to receive the externally threaded neck portion 5, the coupling will be put in place as shown in Fig. 3 and the threaded neck portion 8 of the coupling will be screwed into the supply pipe. The washers 10 and 11 are placed respectively upon the neck portion 8 and within the internally threaded cup portion of the coupling and engage the end of the supply pipe and end of the reduced portion 5 of the faucet neck and will thus serve to provide a water-tight joint so that water cannot leak out around the coupling. It will be further noted that when the coupling is used as shown in Fig. 3 with the threaded neck 8 extending through an opening in the splash board 12 of a sink, the shoulder 9 of this coupling will engage the outer face of the splash board and thus serve to cause the pipe to be drawn into close engagement with the gasket or washer 10. Before the coupling is screwed into the pipe, a collar 13 will be placed upon the coupling and after the coupling and faucet have been tightened, the collar will be moved to engage the splash board and cover the portion thereof through which the coupling extends. The usual set-screw 13′ is provided to retain this collar in the desired position. A similar collar may also be made use of when the faucet is directly connected with the supply pipe. If the faucet is to be connected with a supply pipe which is externally threaded and too large to fit into the internally threaded neck of the faucet, the coupling is put in place as shown in Fig. 2. Before the reduced end portion 8 of this coupling is screwed into the faucet neck, a collar or sleeve 14 will be placed upon the reduced neck and will extend beyond the end thereof so that when the coupling is screwed tightly into place, the neck 5 and washer 10 will be covered. Therefore, the reduced and threaded portion of the faucet neck and the washer 10 will be covered and hidden from view thus providing a neat appearance and further preventing possible damage to the threads of the reduced neck portion. It will thus be seen that with this construction, the faucet may be used in connection with supply pipes of varying sizes and may be either screwed directly into or onto a supply pipe or connected with the supply pipe by means of a coupling screwed into or onto the neck portion of the faucet.

Referring to Figs. 1 and 4, it will be seen that the faucet has its valve stem 15 provided with a turning head 16 in the upper end of which is provided a cup 17 to receive a marker 18. This marker 18 which will be formed of china or any other suitable substance and in cross section will be substantially elliptical. Upon one side is marked the word "Cold" and upon the other side is marked the word "Hot". From an inspection of Fig. 4, it will be readily seen that this marker may be put in place with either side showing according to whether the faucet is to supply hot or cold water and that after the marker is in place, a collar 19 having an inwardly extending flange 20 may be screwed upon the reduced and threaded portion of the turning head. The flange portion 20 of the securing collar extends in overlapping relation to the outer face of the marker and will thus serve to securely but releasably hold the marker in place. There has thus been provided a turning head having a marker which may be positioned to indicate either hot or cold water and may be very easily removed and replaced in case the proper symbol is not showing.

I claim:

1. A faucet having a neck at its inlet end externally threaded for direct reception in an internally threaded supply pipe whenever possible, said neck being internally threaded to directly receive an externally threaded supply pipe whenever possible, and a coupling having an internally threaded end of a size to directly receive said threaded neck if desired or to directly receive an externally threaded supply pipe if advisable, the other end of said coupling having a reduced externally threaded nipple of a size for direct reception either in said neck or in an internally threaded supply pipe, as occasion may require.

2. A structure as specified in claim 1; together with a sleeve of an internal diameter to pass over the neck of the faucet, and of a length slightly greater than the neck, whereby to extend beyond the neck and circumscribe a gasket between the neck end and the body of said coupling when the threaded nipple of said coupling is threaded into said neck.

In testimony whereof I have hereunto set my hand.

CHRISTIAN H. GOTTSCH.